F. G. JORDAN.
REINFORCED CEMENT OR CONCRETE SHIP CONSTRUCTION.
APPLICATION FILED MAY 11, 1918.
1,296,809.
Patented Mar. 11, 1919.
9 SHEETS—SHEET 1.
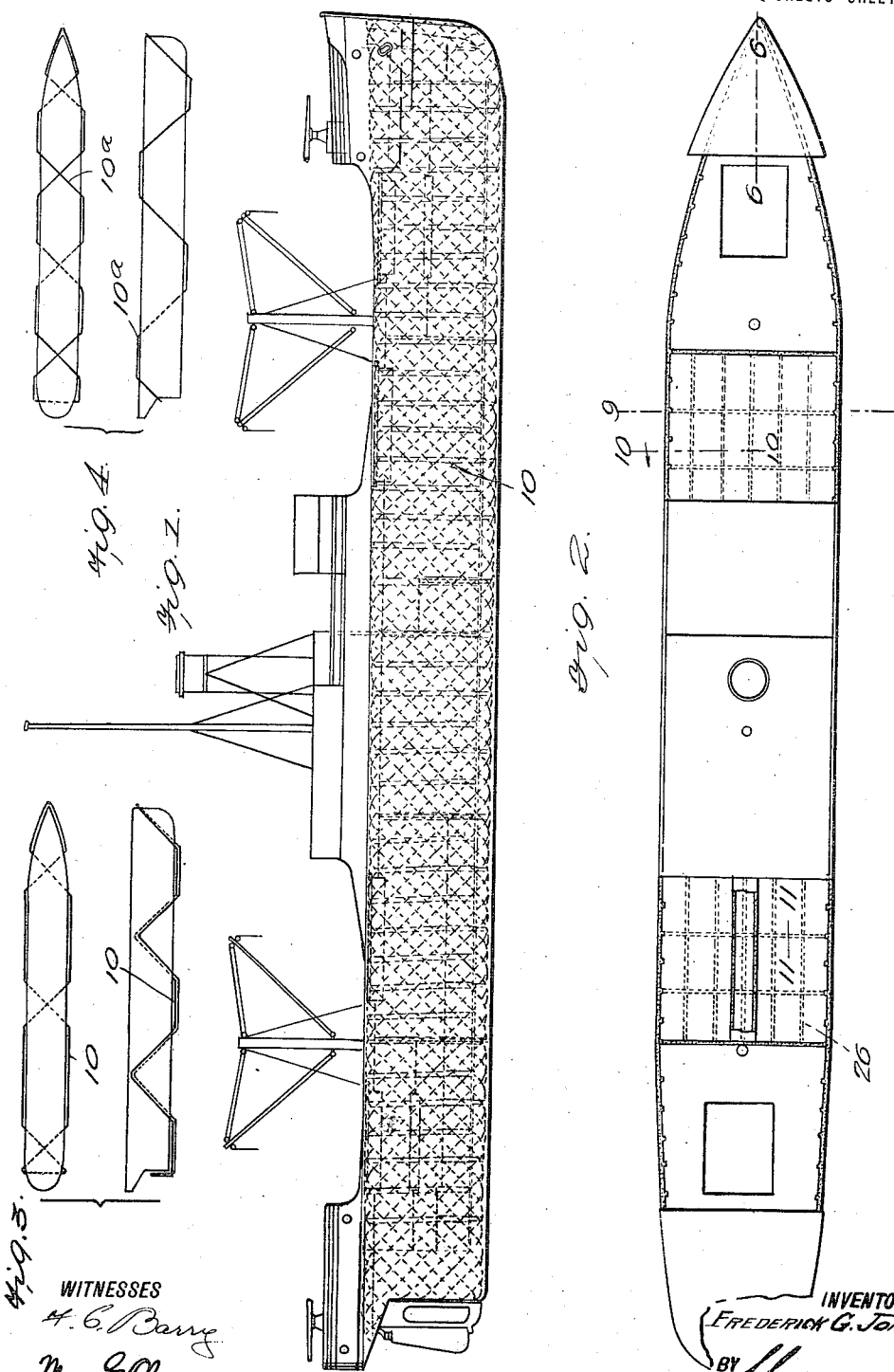
WITNESSES
INVENTOR
Frederick G. Jordan
BY
ATTORNEYS

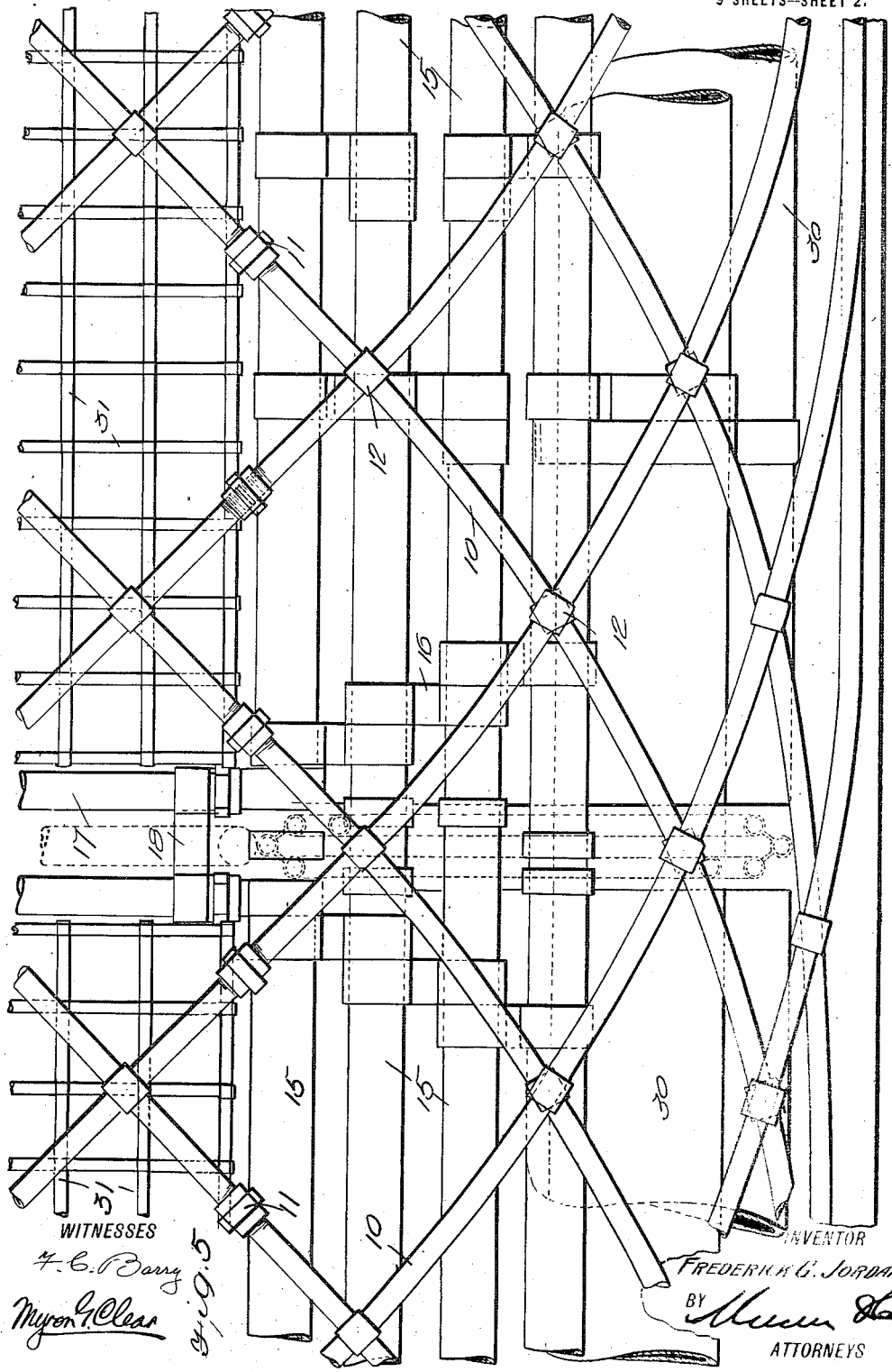

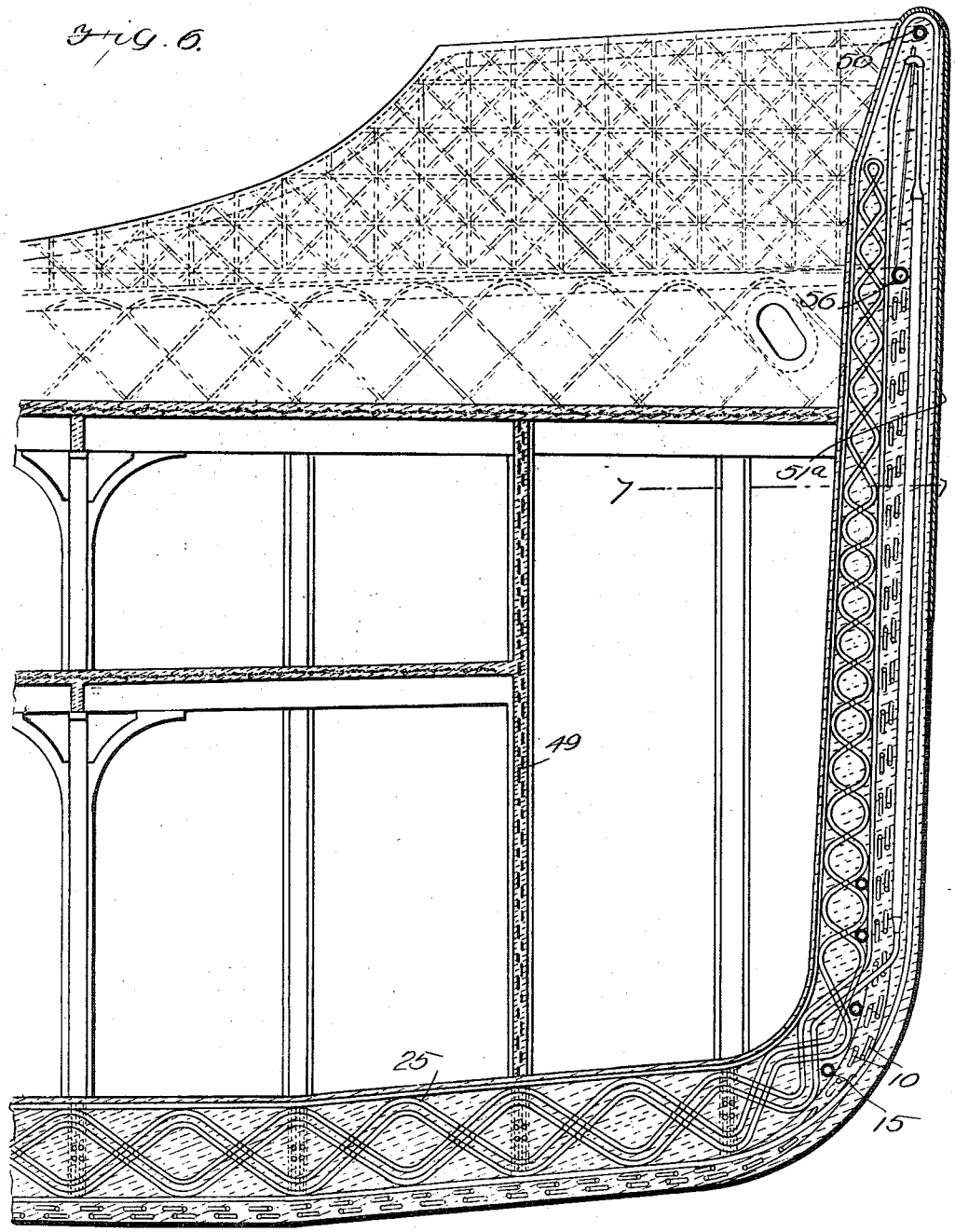

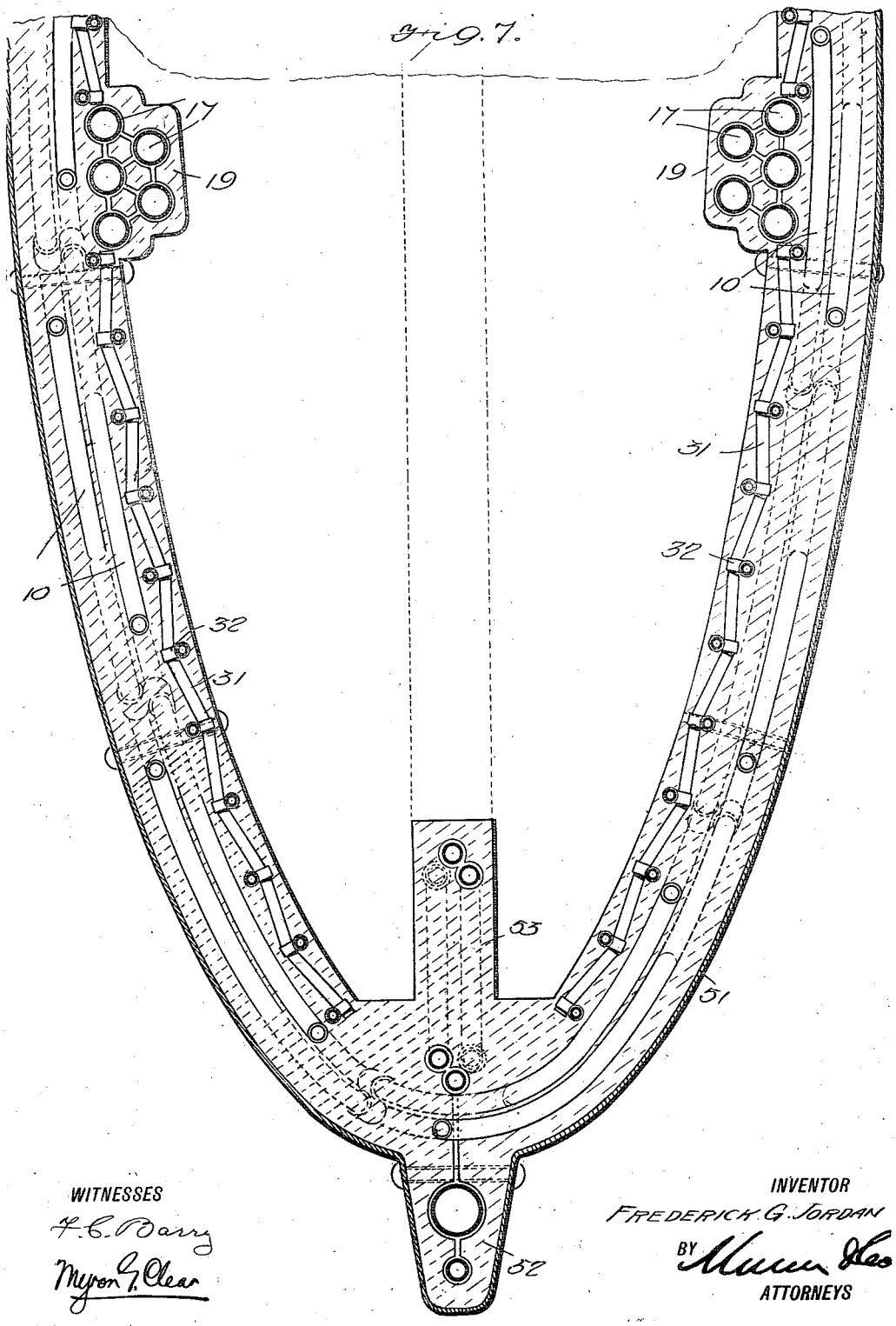

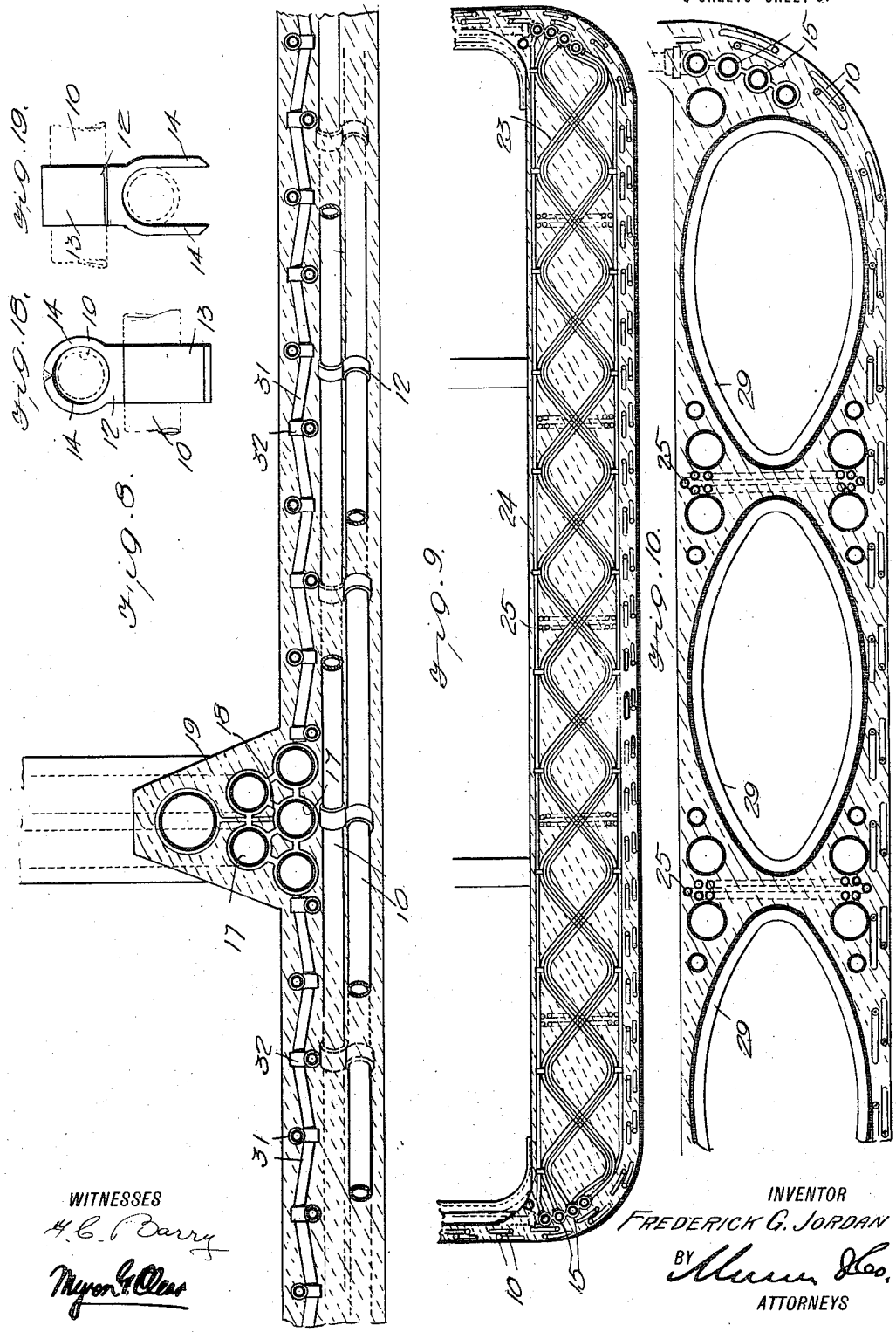

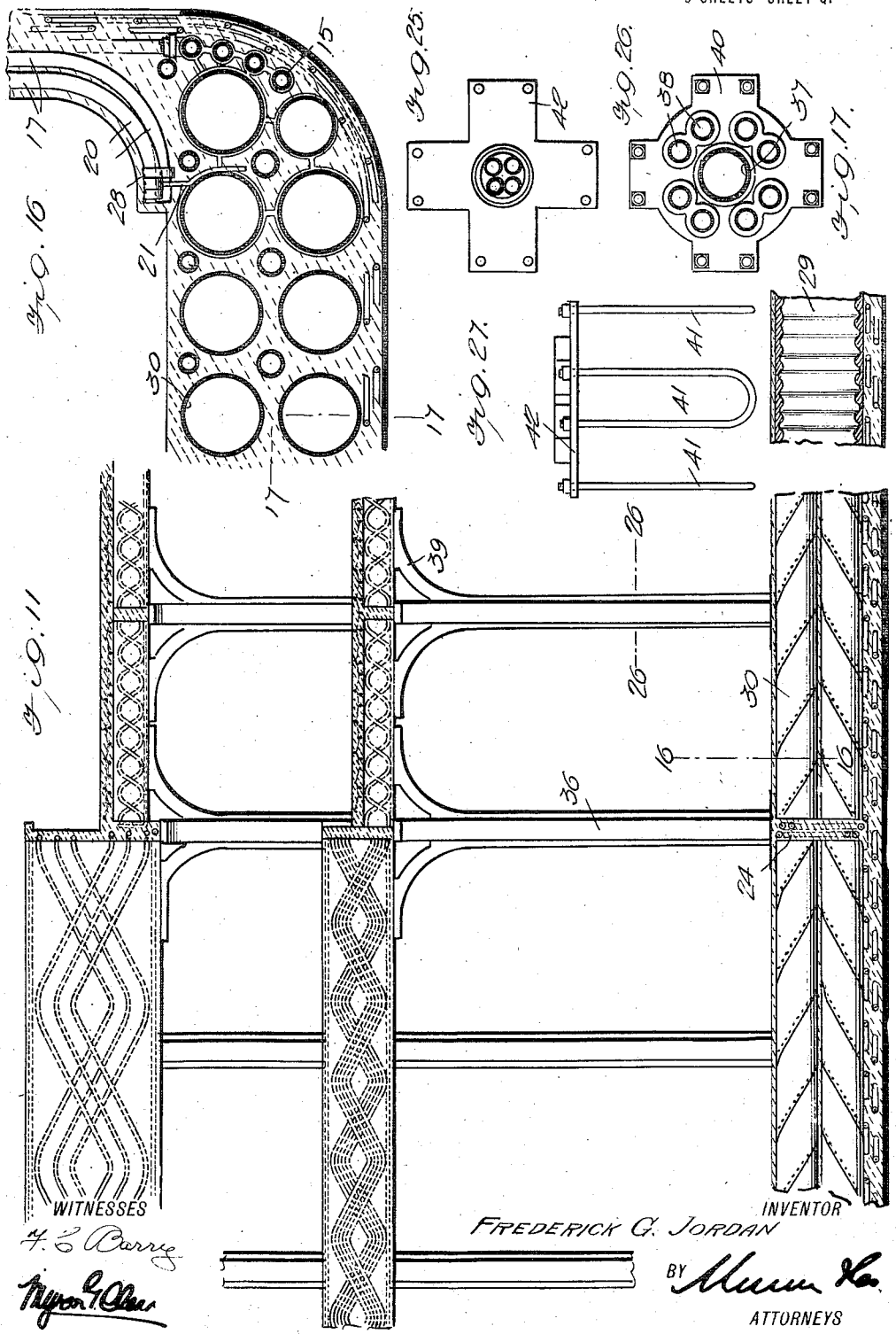

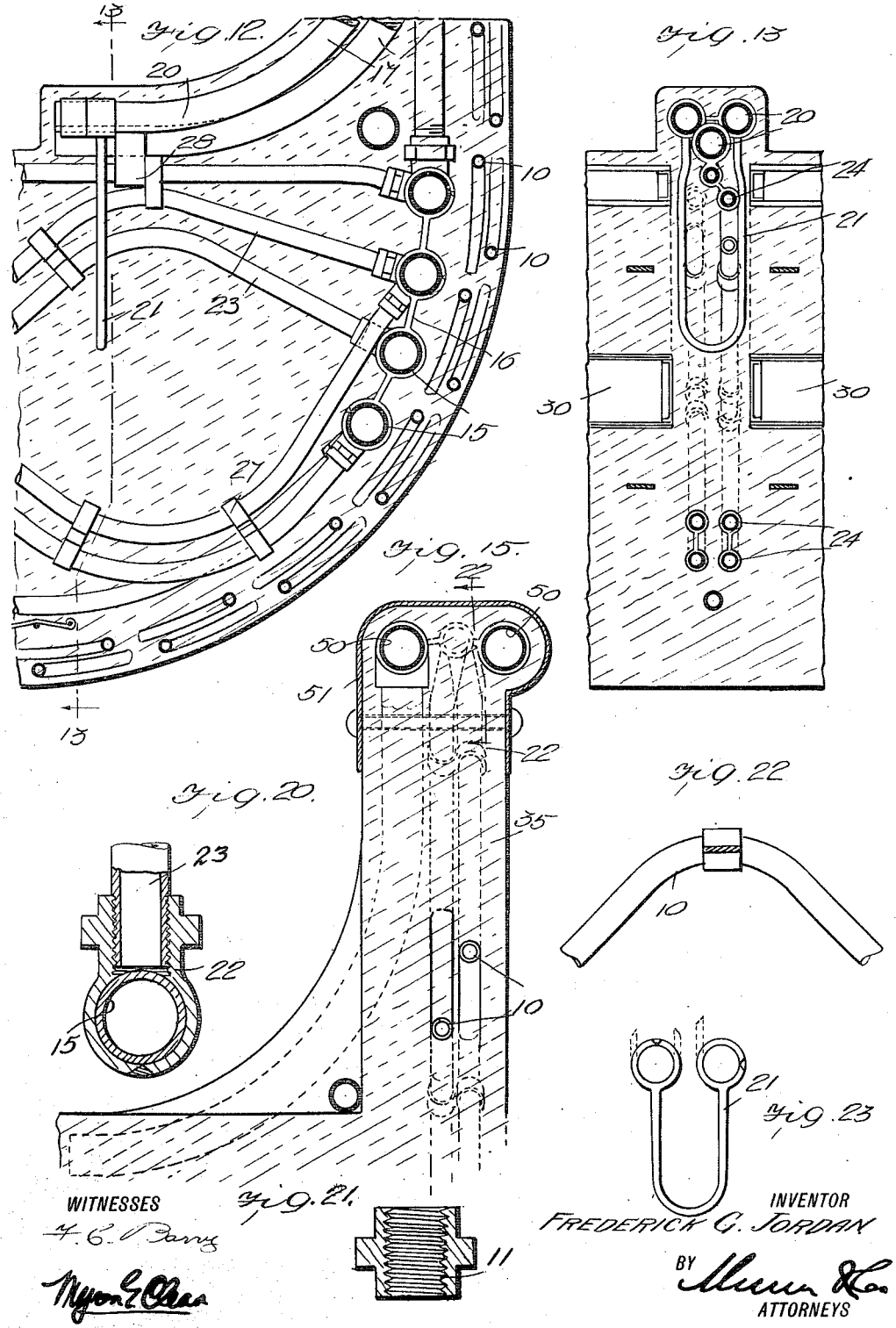

F. G. JORDAN.
REINFORCED CEMENT OR CONCRETE SHIP CONSTRUCTION.
APPLICATION FILED MAY 11, 1918.
1,296,809.
Patented Mar. 11, 1919.
9 SHEETS—SHEET 8.
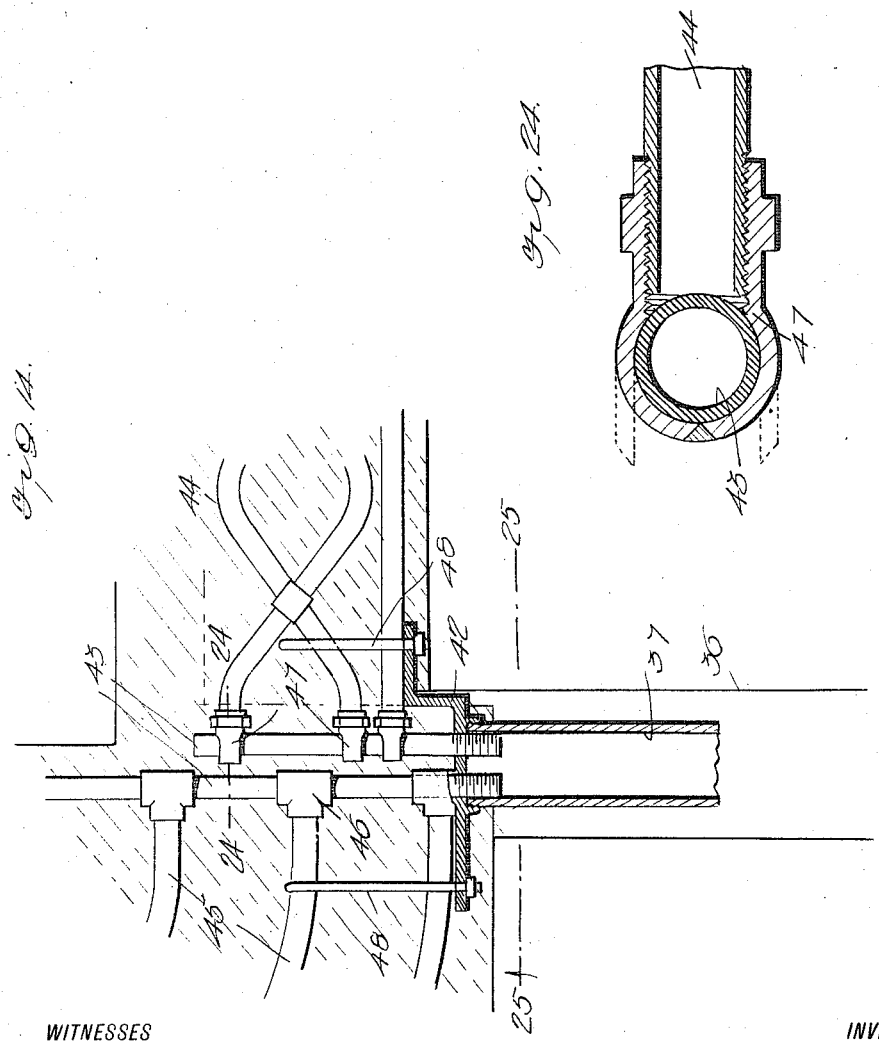
WITNESSES
INVENTOR
FREDERICK G. JORDAN
BY
ATTORNEYS F. G. JORDAN.
REINFORCED CEMENT OR CONCRETE SHIP CONSTRUCTION.
APPLICATION FILED MAY 11, 1918.
1,296,809.
Patented Mar. 11, 1919.
9 SHEETS—SHEET 9.
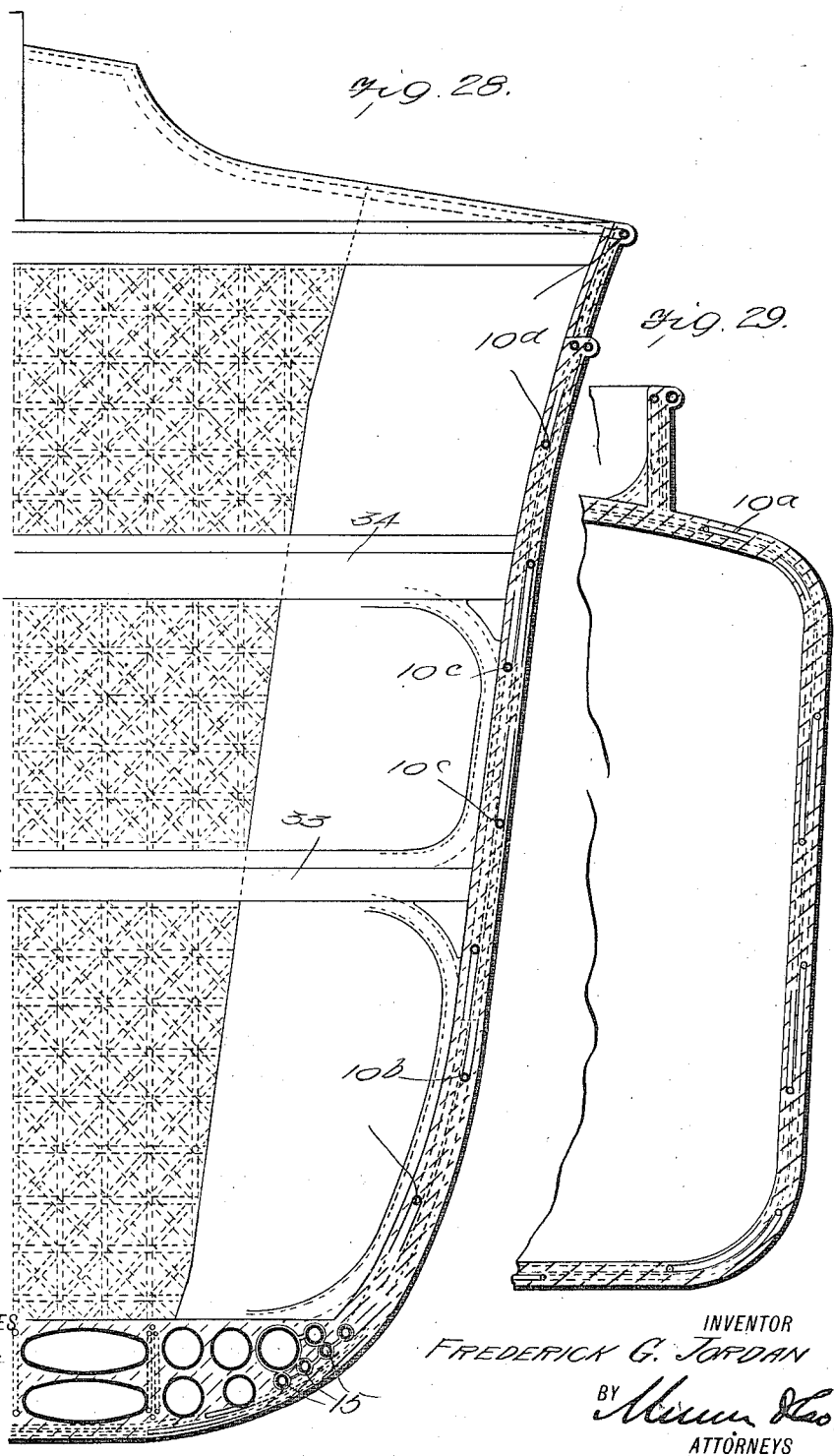

UNITED STATES PATENT OFFICE.

FREDERICK G. JORDAN, OF CEMENT, WASHINGTON.

REINFORCED CEMENT OR CONCRETE SHIP CONSTRUCTION.

1,296,809. Specification of Letters Patent. Patented Mar. 11, 1919.

Application filed May 11, 1918. Serial No. 234,004.

*To all whom it may concern:*

Be it known that I, FREDERICK G. JORDAN, a citizen of the United States, and a resident of Cement, in the county of Pend Oreille and State of Washington, have made certain new and useful Improvements in Reinforced Cement or Concrete Ship Construction, of which the following is a specification.

My present invention relates generally to cement or concrete ships of the various types to which the invention is or may be applicable, certain of which will be mentioned specifically hereinafter, and my invention relates more particularly to the reinforcement of ships constructed of these materials, and has for its main object the provision of a fabricated form, which constitutes the main hull frame, in substantially a single piece, having all of the advantages and strength incident to such a formation, and retaining at the same time a resiliency which will give it, when properly braced, as hereinafter described, a yielding coefficient substantially that of the cement or concrete molded or otherwise placed around the same.

A further object of my invention is the provision of a main fabricated frame forming a part of the reinforcement for the cement or concrete, so arranged that the connected sections whose extremities are coupled to one another may be clamped, at all points of intersection or crossing so as to render the complete frame exceedingly strong although of a generally yielding nature.

A further object of this invention is the provision of a continuous hull reinforcement, the structure of which lends itself with equal facility to general cargo carrying vessels, and to tank steamers, barges and the like, wherein the structural reinforcement may or may not be extended through the upper deck, or in other words, continuously around the hull, and through the upper deck.

A still further object is the provision of such reinforcement as above described, which will admit of ready variation in weight and strength giving properties through definite areas of the hull, that is, one weight in one area and another weight in another area, all dependent upon the size and character of the vessel or its intended use, and a still further object along the same general line is the provision of a reinforcement of this character, the members or sections of which are of such nature that various weights or different strengths may be utilized without varying the external measurements, and hence without necessitating any accommodating changes in the surrounding parts or adjacent connections.

Other and further objects relate to various reinforcing connections throughout the ship construction and peculiarly incidental thereto, and will be more apparent and more plainly to be seen from the following description having reference to the accompanying drawings forming a part of this specification, and wherein:—

Figure 1 is a side elevation of a ship whose construction embodies my invention;

Fig. 2 is a top view partly in plan and partly in horizontal section;

Fig. 3 includes a plan and side view showing the outer continuous reinforcing skin of the structural frame as in Fig. 1;

Fig. 4 includes a plan and side view with the outer skin of the structural frame extending entirely around the ship through and across the upper deck as in the case of a closed tanker or barge;

Fig. 5 is an enlarged side view of a lower portion of the complete structural frame adjacent to the bilge;

Fig. 6 is an enlarged vertical longitudinal section through the bow of the ship taken substantially on line 6—6 of Fig. 2;

Fig. 7 is an enlarged horizontal section through the bow taken substantially on line 7—7 of Fig. 6;

Fig. 8 is an enlarged horizontal section taken through a portion of one side;

Fig. 9 is a transverse vertical section through the ship bottom taken substantially on line 9—9 of Fig. 2;

Fig. 10 is an enlarged view in vertical transverse section taken through the ship bottom substantially on line 10—10 of Fig. 2;

Fig. 11 is a partial, vertical section taken substantially on line 11—11 of Fig. 2;

Fig. 12 is an enlarged detail through the bilge portion of Fig. 9;

Fig. 13 is a detail vertical section taken substantially on line 13—13 of Fig. 12;

Fig. 14 is an enlarged vertical section through the upper end of one of the supporting pillars;

Fig. 15 is a vertical transverse section taken through the gunwale;

Fig. 16 is a detail transverse section taken substantially on line 16—16 of Fig. 11;

Fig. 17 is a detail longitudinal section taken substantially on line 17—17 of Fig. 16;

Figs. 18 and 19 are details of one of the connecting clamps;

Fig. 20 is a detail section through one of the connectors;

Fig. 21 is a detail section of one of the couplings;

Fig. 22 is a vertical longitudinal section taken substantially on line 22—22 of Fig. 15;

Fig. 23 is a detail elevation of one of the U-anchors of Figs. 12 and 13;

Fig. 24 is a detail horizontal section taken substantially on line 24—24 of Fig. 14;

Fig. 25 is a similar view taken substantially on line 25—25 of Fig. 14;

Fig. 26 is another similar view taken substantially on line 26—26 of Fig. 11;

Fig. 27 is a detail side view of one of the lower pillar base plates removed and with its anchors;

Fig. 28 is a vertical transverse section through one side of a ship showing a modified form of bulkhead reinforcement, and, Fig. 29 is a similar view illustrating a modified form of hull reinforcement.

Referring now to these figures, and particularly to Figs. 1, 3 and 5, the main reinforcement for the fabricated reinforcing frame as proposed by my invention, and which main reinforcement constitutes the outer portion or skin of the completed frame, is constructed of a continuous cylindrical reinforcing member formed of any desired or necessary numbers of elongated cylindrical sections 10, whose ends are coupled at 11, these members being bent to shape and starting from the bow for instance, they are extended downwardly along one side of the ship around the bottom thereof, and up the other side, down on the latter side, and again across the bottom and up on the first side, this extension being carried around the stern of the ship and back in the same way, although in reverse relation and proceeding then along the same general scheme around both bow and stern until the complete reinforcing skin of the reinforcing frame appears as shown in dotted lines in Fig. 1, with the members thereof in inclined relation with respect to the sides of the ship and in cross relation with respect to one another.

The ends of these reinforcing members 10 are preferably threaded and connected by threaded couplings 11, of which one is shown in detail in Fig. 21, and at all points of crossing, the contiguous points of cross members are connected by clamps 12, the specific nature of which is well illustrated in Figs. 18 and 19.

As shown in these latter figures, each of the clamps 12 has a tubular portion 13 through which one of the crossing members 10 passes, as well as extending arms 14, as plainly seen in Fig. 19, which are bent around the other crossing member 10, as seen in Fig. 18.

The reinforcing members 10 as thus joined by the clamps 12, which may in addition be welded, will constitute a general reinforcing skin of the shape of the hull of the ship in connection with which the reinforcement is to be utilized, and instead of bending at the upper portions of the ship sides to proceed upwardly and downwardly along the same side before crossing the bottom of the ship, they may proceed up the sides and across the top, as well as the bottom in connection with tankers, barges and other closed deck type of ships, as seen in Figs. 4 and 29.

The reinforcement thus provided by the fabricated skin constructed as described is susceptible of great variation, without difficulty in connection with ships of different weight, or whose use requires more or less heavy reinforcement or heavy and light reinforcement in different areas. While the reinforcing members 10 and 10$^a$ may be formed of solid bars, it is preferable that they be of the tubular nature shown as tubular reinforcing members in this connection are calculated to give certain added advantages which I will now describe. For instance, tubes as a commercial product may be obtained in heavy, light and medium weights, due to the thickness of the walls, these various weights being, however, of the same external diameter so that it is obvious that light weight, medium weight and heavy weight tubes may be utilized in different areas of the same fabricated skin, connected by the same couplings, and presenting the same appearance, without the necessity for making any changes in a previously completed plan of uniform weight construction. Ships of light and heavy reinforcement may thus be fabricated from the same plans with either uniform weight throughout the reinforcement or various weights in different zones or areas as may be desirable or necessary.

Fig. 28 shows a transverse vertical section through one side of a cement or concrete ship whose sides are of gradually diminishing thickness in an upward direction and in connection with which it may be readily seen that a variation of the weight of the reinforcement, as above suggested, or an increase in the number of reinforcing members, with a decrease in the size of mesh, becomes highly to be desired, the lower reinforcement 10$^b$ for instance being of light weight, the middle reinforcement 10$^c$ of medium weight, and the upper reinforcement 10$^d$ of heavy weight, with the same appearance. If desired, however, both weight and size may be changed, diminishing with the concrete wall from the bilge to the gunwale.

In addition to the outer reinforcement for the skin, which, as described, extends entirely around the ship, around both bow and stern, as will be seen by reference to Figs. 6 and 7, another important reinforcement constituting a part of the fabricated frame is in the form of a series of tubular reinforcing members 15, encircling the ship at the bilge, and whose curvature as a series, as best seen in Figs. 10 and 12, coincides with that of the ship between its bottom and side walls. These reinforcing bilge tubes 15 are connected to one another by connecting frames 16, and are also connected to certain of the vertical tubular reinforcing members 17 the latter being connected by frames 18, as clearly seen in Figs. 5 and 8. These series of vertical reinforcing tubes 17 extend upwardly at spaced points around the ship inwardly, beyond the outer skin reinforcement, previously described, and support the inner hull ribs or frames 19 and the lower ends of the majority of these tubes, of each series, are turned inwardly at the bilge as seen at 20 in Figs. 12 and 16, the lower extremities of certain thereof having U-shaped anchors 21, one of which is seen in detail in Fig. 23, which depend into the cement or concrete mass, the lower bent ends 20 of members 17 forming inner abutments around the bottom of the ship.

The bilge reinforcing tubes 15 have also connected thereto, by means of connecting members 22, one of which is seen in detail in Fig. 20, the ends of the oppositely extending and upwardly and downwardly bent floor frame reinforcing tubes 23, which are embedded in the floor frames 24, and between which, in the course of their length, extend the similarly bent longitudinal reinforcing tubes 25, for example within longitudinal bottom ribs 26 of Fig. 2 also connected to the bilge tubes 15 by members similar to the members 22. The several tubes of the floor frames as well as those of the keel and the longitudinal bottom ribs, may be clamped to one another by clamps 27, certain of which are seen in Fig. 12, and the lower curved ends 20 of certain of the vertical rib reinforcing tubes 17 may be clamped to certain of the floor frame reinforcing tubes 23, as by means of clamps 28 shown in Fig. 12.

Between the floor frames 24 the ship bottom may be reinforced either by corrugated oval tubes or tanks 29, as seen in Figs. 10 and 17, or by spiral riveted pipes 30, as seen in Figs. 11 and 16, or by both utilized at different longitudinal points between floor frames, it being obvious that either of these bottom reinforcements may be utilized as storage tanks or for allied purposes.

Above the bilge tubes 15, the wall of the hull from bow to stern is additionally reinforced between the vertical ribs or frames 19 by means of net work of vertical and horizontal tubes 31, clamped at their junctures or points of crossing by clamps 32, which may be similar to the before described clamps 12, connecting the outer skin tubes 10.

As seen in Figs. 15 and 28, certain of the vertical rib or frame reinforcing tubes 17 may be turned inwardly at their opposite ends adjacent the several deck planes to form supporting knee abutments around the several decks 33 and 34 of Fig. 28, as well as the upper deck adjacent the gunwale 35, as seen in Fig. 15, the decks being all suitably reinforced, with supporting beams below the same, also reinforced and supported by vertical pillars 36, which are also disposed around the hatch-ways, as seen in Fig. 11, and are in turn reinforced by vertical tubes 37 and 38, 37 being the center tube, as seen in Fig. 6, with tubes 38 surrounding the same in series, so as to be bent outwardly at their upper ends and into supporting elbows 39, as seen in Fig. 11, for instance.

The tubes 37 and 38 extend upwardly in each pillar over and through a lower or base plate 40, as seen in Fig. 26, which may have extensions supporting U-bolts 41, as seen in Fig. 27, which depend into the mass of the ship bottom for anchorage, and the upper end of the center tube 37 of each pillar connects, as seen in Fig. 14, with an upper cap plate 42, a plan of which appears in Fig. 25, through which vertical reinforcing tubes 43 may be extended to connect the ends of the floor bottom or deck stringer reinforcing tubes 44 and 45, the latter being secured to the vertical tubes 43 by either the conventional pipe couplings 46, or by special clamps 47, one of which is seen in Fig. 24, and of substantially the same character as the connectors 22 of Fig. 20. The upper cap plates 42 may also carry upwardly projecting U-bolts 48, as seen in Fig. 14, which embed in the decks or deck beams or the hatch walls, and in the vertical walls or at least certain thereof metal lath 49 may be embedded if desired in the manner seen in Fig. 6.

The longitudinal reinforcing tubes 25 include corrugations which extend along the keel, and these keel reinforcing tubes 25 extend upwardly within the outer skin at the bow and stern, diminishing gradually in an upward direction, as seen in the section through the bow, Fig. 6, and projecting at least to the upper edge of the outer skin reinforcement at which point the latter may be connected, as seen in dotted lines in Fig. 15, to the gunwale reinforcing tubes 50, to which certain of the vertical rib reinforcing tubes 17 are also connected.

The gunwale may have in addition to the reinforcing tubes 50, a surrounding protecting cap 51, and at the bow this cap may increase to form a bumper shield 51ª as seen in Fig. 7, in which the outer, as well as the inner extension of the keel plainly appears at 52 and 53, each having certain reinforcing pipes connected into or forming a part of the keel reinforcing pipes 25 of the ship bottom.

Thus it is apparent that by means of the pillars and their reinforcing tubes, the internal walls, decks, hatch-ways, etc., will be effectively reinforced, attention being particularly called to the curving of certain of the pillar reinforcing tubes to form the knee abutments for additional support as hereinbefore described.

It will also be apparent from the foregoing description that the outer reinforcing skin first mentioned forms one single truss, receiving and distributing strains, both longitudinal and torsional stresses, throughout this truss, so as to uniformly absorb and resist the same, and that it is susceptible of such changes in size, weight and utilization as to permit of its use with minimum difficulties in case such changes become desirable, or imperative.

I claim:—

1. A reinforcement for concrete and cement vessels, including an embedded hull reinforcing member in sections, connected end to end, and bent to pass spirally around the sides, bottom, bow and stern, and forming an open mesh framework.

2. A reinforcement for concrete and cement vessels including a single convolute strand bent to pass spirally around the bottom from side to side and in alternately opposite directions between and around the stern and bow, forming an open mesh framework.

3. A reinforcement for concrete and cement vessels including a single convolute strand bent to pass spirally around the bottom from side to side and alternately from bow to stern and stern to bow, forming an open mesh truss, and means connecting the convolutions at their points of intersection, as described.

4. A reinforcement for concrete and cement vessels including a single convolute strand bent to pass spirally around the bottom from side to side and alternately from bow to stern and stern to bow, forming an open mesh truss, the said strand being in longitudinal sections and having couplings connecting the sections in end to end relation as described.

5. A reinforcement for concrete and cement vessels including a series of longitudinal sections having their ends coupled to form an endless reinforcing member in the nature of a single strand, said member being bent spirally into convolutions forming an open mesh framework of hull shape.

6. A reinforcement for concrete and cement vessels consisting of a hull shaped frame of open mesh, formed of a single endless reinforcing member bent spirally from side to side and alternately between bow and stern in relatively opposite directions.

7. A reinforcement for concrete and cement vessels consisting of a hull shaped frame of open mesh, formed of a single reinforcing strand bent spirally from side to side and alternately between bow and stern in relatively opposite directions, the bent convolutions being connected at their points of intersection as described.

8. A reinforcement for concrete and cement vessels including a frame of hull shape formed of a single reinforcing strand bent angularly up and down at the sides and across the bottom thereof and proceeding spirally from one end of the frame to the other in alternately opposite directions.

9. A reinforcement for concrete and cement vessels including an open mesh frame of hull shape, formed of a single continuous convolute strand bent spirally from side to side and end to end of the frame, the convolutions of which are joined to one another.

10. A reinforcement for concrete and cement vessels comprising an outer open mesh frame of hull shape, a series of horizontally disposed endless reinforcing members within and around the frame at the bilge, longitudinal and transverse reinforcements extending across the inside of the frame and connected at their ends to separate points of the bilge reinforcements, and vertical reinforcements within the outer frame and at spaced points therearound, connected at their lower ends to the bilge reinforcements.

11. A reinforcement for concrete and cement vessels including a series of bilge reinforcing members, and vertical and horizontal reinforcing members connected at their ends to the said bilge reinforcing members, the said horizontal reinforcing members extending both longitudinally and transversely across the space within the bilge reinforcing members and connected at their ends to said latter members.

12. A reinforcement for concrete and cement vessels comprising a series of reinforcing members extending therearound at the bilge, and spaced series of vertical reinforcing members certain of which members of each series are connected to the bilge reinforcements and the other members of each series are bent inwardly and are anchored and terminate in the mass of the vessel bottom.

13. A reinforcement for concrete and cement vessels including a series of tubular horizontally disposed reinforcing members extending around the bilge, spaced series of vertical reinforcing members certain of which are connected to the bilge reinforcements and certain of which are bent inwardly at their ends to form knee abutments and anchors for securing the latter ends as described.

14. A reinforcement for concrete and cement vessels comprising a series of tubular reinforcing members disposed horizontally and encircling the bilge, horizontally disposed reinforcing members extending across and connecting the bilge reinforcements at separate points and embedded in the mass of the vessel bottom, and tubular reinforcing members extending in series between separate points of the said connecting reinforcements and also embedded in the mass in the bottom.

15. A reinforcement for concrete and cement vessels including tubular reinforcing members disposed horizontally and each encircling the bilge and having connecting reinforcements embedded in the mass of the vessel bottom and extending across and between portions of said bilge reinforcements, spaced series of vertical reinforcements having connections with the bilge reinforcements and embedded in the side ribs of the vessel, and open mesh frames embedded in the walls of the hull between said vertical rib reinforcements, as described.

FREDERICK G. JORDAN.